United States Patent [19]

Inoue

[11] Patent Number: 4,559,115
[45] Date of Patent: Dec. 17, 1985

[54] METHOD OF AND APPARATUS FOR MACHINING CERAMIC MATERIALS

[75] Inventor: Kiyoshi Inoue, Tokyo, Japan

[73] Assignee: Inoue-Japax Research Incorporated, Kanagawaken, Japan

[21] Appl. No.: 615,416

[22] Filed: May 30, 1984

[30] Foreign Application Priority Data

May 30, 1983 [JP] Japan ................................. 58-96727
May 31, 1983 [JP] Japan ................................. 58-97586

[51] Int. Cl.$^4$ ........................... B23P 1/04; B23P 1/06; B23P 1/10; C25F 3/14
[52] U.S. Cl. ............................... 204/129.1; 204/129.3; 204/129.46; 204/129.5; 204/129.6; 204/224 M; 204/217; 219/68; 219/69 M
[58] Field of Search ............... 204/129.1, 129.3, 129.5, 204/129.6, 129.46, 217, 224 M; 219/69 M, 69 R, 68

[56] References Cited

U.S. PATENT DOCUMENTS

| | | | |
|---|---|---|---|
| 3,475,312 | 10/1969 | Inoue | 204/217 |
| 3,706,645 | 12/1972 | Lasser | 204/129.3 |
| 4,063,063 | 12/1977 | Funck et al. | 219/121 LM |
| 4,283,259 | 8/1981 | Melcher et al. | 204/129.3 |
| 4,379,022 | 4/1983 | Melcher et al. | 156/643 |
| 4,409,075 | 10/1983 | Kolbesen | 204/129.3 |
| 4,448,656 | 5/1984 | Kuromatsu | 204/217 X |

FOREIGN PATENT DOCUMENTS 48-2100 1/1973 Japan ............................. 204/224 M
847927 10/1956 United Kingdom .

Primary Examiner—Donald R. Valentine
Attorney, Agent, or Firm—Karl F. Ross; Herbert Dubno

[57] ABSTRACT

Efficient, high-precision machining of ceramic materials is achieved by supplying onto a workpiece of a ceramic material a liquid electrolyte having components at least one of which is normally inert to but becomes chemically reactive with the ceramic material at an elevated temperature, and applying to a limited zone of interface between the liquid electrolyte and the workpiece, localized energy of a magnitude sufficient to heat the liquid electrolyte and the ceramic material there to the elevated temperature and to remove from the workpiece the locally heated ceramic material in a form at least partially chemically degenerated with that electrolytic component. The limited zone acquiring the localized energy is displaced in a scanning manner from one region to another on the workpiece along numerically programmed path to consecutively remove the ceramic material along the path from the workpiece.

21 Claims, 9 Drawing Figures

METHOD OF AND APPARATUS FOR MACHINING CERAMIC MATERIALS

FIELD OF THE INVENTION

The present invention relates to a method of and apparatus for machining a workpiece of a ceramic material, i.e. a ceramic such as a metal oxide, nitride, carbide, boride, silicide, fluoride, sulfide, phosphide, arsenide or selenide, a composite of one or more ceramics, or a composite of one or more ceramics with one or more metals, such as a cermet, ceramet or ceramal.

BACKGROUND OF THE INVENTION

Because of their unique, excellent properties not generally offered by metals (e.g. hardness, high melting point and chemical stability), ceramic materials have been known to be highly useful materials. Unfortunately, these materials are not only hard but brittle and dielectric or electrically nonconductive so that they are not readily machinable by an existing machining technique, e.g. abrasive grinding or cutting, electrical discharge machining or electrochemical machining. Accordingly, there have been severe limitations in their uses as to expanding their industrial applicabilities.

It is known that ceramics, which are highly stable against chemical attacks under normal conditions, become chemically reactive when placed at an elevated temperature. It has been believed impossible, however, to effectively exploit this fact in machining a ceramic material since no practical means or material was deemed to be available which could, without serious attacks, withstand a chemical heated to an elevated temperature in storing, supplying and recovering it.

OBJECTS OF THE INVENTION

It is, accordingly, an important object of the present invention to provide a new, improved and efficient method of machining a ceramic material.

Another important object of the invention is to provide an apparatus for performing the method described.

SUMMARY OF THE INVENTION

In accordance with the present invention there is provided, in a first aspect thereof, a method of machining a workpiece of a ceramic material, which method comprises bringing into contact with the workpiece a liquid electrolyte having components at least one of which is chemically reactive with the ceramic material at an elevated temperature; applying to a limited zone of interface between the liquid electrolyte and the workpiece, localized energy of a magnitude sufficient to heat the liquid electrolyte and the ceramic material at the limited zone to the elevated temperature and to remove from the workpiece the locally heated ceramic material at the limited zone in a form at least partly chemically degenerated with said at least one electrolytic component; and displacing, in a scanning manner, the limited zone acquiring the localized energy from one region to another on the workpiece along a programmed continuous path to continuously remove the ceramic material along the path from the workpiece.

The invention also provides, in a second aspect thereof, an apparatus for machining a workpiece of a ceramic material, which apparatus comprises: means for supplying onto the workpiece a liquid electrolyte having components at least one of which is chemically reactive with the ceramic material at an elevated temperature; means for applying to a limited zone of interface between the liquid electrolyte and the workpiece, localized energy of a magnitude sufficient to heat the liquid electrolyte and the ceramic material at the said limited zone to the elevated temperature and to remove from the workpiece the locally heated ceramic material at the said limited zone in a form at least partially chemically degenerated with the at least one component; and means for displacing, in a scanning means, the said limited zone acquiring the localized energy from one region to another on the workpiece along a programmed continuous path to continuously remove the ceramic material along the said path from the workpiece.

BRIEF DESCRIPTION OF THE DRAWING

These and other features of the invention as well as advantages thereof will become more readily apparent from a reading of the following description when taken with reference to the accompanying drawing in which.

SPECIFIC DESCRIPTION

Figure 1:
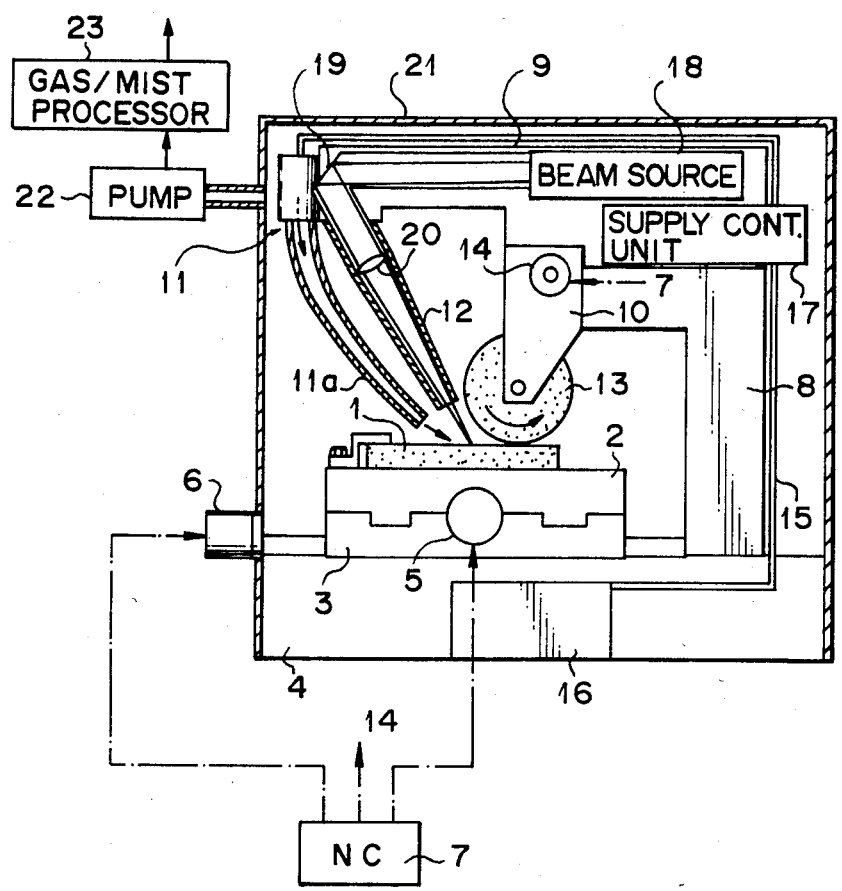
FIG. 1 is a diagrammatic front view illustrating a machining apparatus embodying the principles of the present invention.

Referring now to FIG. 1, a workpiece 1 composed of a ceramic material is securely mounted on a worktable 2. The worktable is an upper drive table which is movably mounted on a lower drive table 3 which is in turn movably mounted on a machine base 4. The upper and lower drive tables 2 and 3 are in a conventional cross-feed arrangement on the base 4 and are moved by motors 5 and 6, respectively, which are driven by command signals furnished from a control unit 7, e.g. an NC (numerical controller), to displace the workpiece 1 along a programmed path in a horizontal or X-Y plane.

The base 4 has a column 8 standing upright thereon which carries a pair of horizontally extending heads 9 and 10. The upper head 9 mounted on the lower head 10 carries at its end portion a liquid delivery unit 11 and a beam gun 12 while the lower head 10 carries at its end a rotary abrasive wheel 13 which is rotated by a motor (not shown). The head 10 is movable vertically or along a Z-axis and so moved by a motor 14 provided thereon to jointly move the liquid delivery unit 11, the beam gun 12 and the abrasive wheel 13 up and down. The liquid delivery unit 11 comprises a nozzle 11a towards its lower end, communicates via a supply conduit 15 with a tank 16 containing a liquid electrolyte and accommodated in the base 4. The liquid electrolyte in the tank 16 is controlledly drawn by a pump (not shown) through a liquid supply control unit 17 and the delivery unit 11 onto the workpiece 1. The beam gun 12 is connected to a source 18 of an energy beam such as a laser beam or microwave beam. The energy beam from the source 18 is guided by a reflector 19 and a lens 20 to pass out of the gun and impinge onto the workpiece 1.

The motor 14 is furnished from the NC unit 7 with command signals to move the heads 9 and 10 jointly and the rotating wheel 13 into abrasive contact with the workpiece 1. The beam gun 12 is pivotally mounted on the head 9 to be swivelable to enable adjustment of the position of impingement of the energy beam on the workpiece 1 with respect to the position of abrasive contact of the wheel 13 with the workpiece 1. The liquid delivery unit 1 may be arranged to be movable jointly with the beam gun 12. The nozzle portion 11a of the liquid delivery nozzle unit 11 is flexible and bendable but self-sustaining so that the nozzle opening may be disposed at a desired position with respect to the beam gun 12 and the abrasive wheel 13 by manipulating the physical flexibility of that portion.

The liquid electrolyte is preferably an aqueous solution of a strong acid (e.g. hydrochloric acid, sulfuric acid or nitric acid) providing hydrogen ions or a strong base (e.g. sodium hydroxide or potassium hydroxide) providing hydroxide ions. A ceramic material is highly inert to such chemicals under normal conditions or at a room temperature but becomes highly reactive with hydrogen and/or hydroxide ions at an elevated temperature. Water (e.g. distilled) is also suitable since it upon electrolysis provides hydrogen and hydroxide ions.

The liquid electrolyte from the reservoir 16 is controlledly delivered through the nozzle unit 11 onto the surface of the workpiece 1. The control unit 16 is adjusted to deliver the liquid electrolyte at a volume flow rate, say, between 1 and 100 cc/s and at a velocity, say, between 10 and 100 m/s. The liquid electrolyte may flow on the workpiece 1, traversing the path of the energy beam directed from the gun 12 onto the workpiece 1. The energy beam is focused by the lens 20 to impinge on a narrow spot or limited zone of a size generally between 1 to 100 $\mu$m, preferably not greater than 10 $\mu$m, at an interface between the liquid electrolyte and the workpiece 1 so that the latter two at that spot is instantaneously heated up to an elevated temperature sufficient to cause a portion of the ceramic material with activated hydrogen and/or hydroxide ions or radicals. The localized beam energy and reaction also create an impulsive pressure. As a result, the ceramic material at that limited zone is instantaneously dislodged in a form at least partially chemically degenerated from the workpiece 1.

To advance dislodgment or material removal along a programmed path, the motors 5 and 6 are driven under control commands from the NC unit 7 to displace the workpiece 1 accordingly. The abrasive wheel 13, which is rotated in the direction of the arrow, is optionally but preferably provided to apply a mechanical action to an area on the workpiece immediately behind an area of impingement of the energy beam, thereby facilitating removal of the beam stock at that area from the workpiece 1. Where the abrasive wheel 13 is employed to this end, the beam gun 12 is swivelably oscillated by means not shown to oscillate the energy beam transversely, i.e. in a direction parallel to the thickness of the wheel, and with an amplitude such that ahead of the wheel there lies a zone of chemical degeneration of a width substantially equal to the width thereof. The beam gun 12 may be oscillated at a frequency of, say, 100 KHz to 200 MHz.

The vertical position of the abrasive wheel 13 and the rate of displacement of the workpiece 1 are set in the NC unit 7 in conjunction with the depth of material removal or machining desired in the workpiece 1. The energy beam source 18 may have a variable setting, which can again be controlled by the NC unit 7, to change the energy and/or the focal point of the beam as machining proceeds in the workpiece 1. The supply control unit 16 for the liquid electrolyte also has a variable setting which may again be controlled by the NC unit to change the pressure, flow rate and/or velocity of the liquid electrolyte delivered onto the workpiece 1.

The energy beam may be a beam of laser, microwaves or plasma and generally should have an energy density in excess of $10^2$ watts/cm$^2$ but not in excess of $10^6$ watts/cm$^2$. It has been found that bests results are most often obtained when the beam energy ranges between $10^3$ and $10^4$ watts/cm$^2$ or up to $5 \times 10^5$ watts/cm$^2$. Preferably, two or more different forms of energy beams are jointly employed. Also, an energy beam is preferably employed jointly with one or more different forms of localized energization such as ultrasonic mechanical vibrations or electrical discharge energy as will be described.

Also preferably, a cover member 21 is provided to accommodate the machining space and to prevent the liquid electrolyte and machining products from splashing or emitting into the environment. Mists and gases evolved in the machining zone are confined within a chamber defined by the cover member 19 and are drawn by means of a suction pump 22 outside of the chamber and rendered harmless by a conventional mist-/gas treatment unit 23.

Figure 2:
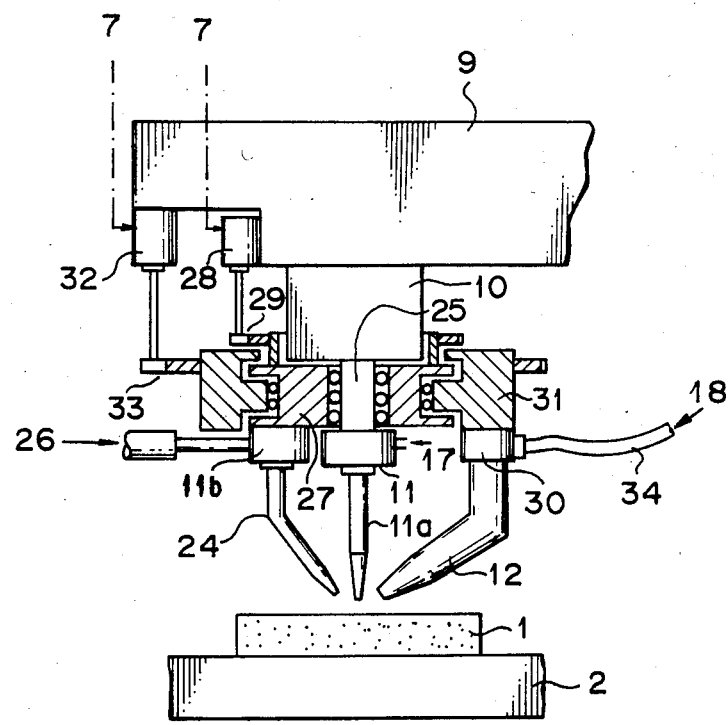
FIG. 2 is a diagrammatic side view illustrating a modification of a portion of the apparatus shown in FIG. 2.

FIG. 2 shows a modification of a portion of the embodiment of FIG. 1 in which the abrasive wheel (13) is replaced by a fluid honing nozzle 24 and the beam gun 12 as well as the fluid honing nozzle 24 can be oriented towards successive spots on a programmed machining path in spite of changes in the course thereof. In this arrangement, a liquid delivery unit 11 having a nozzle 11a extending vertically is securely supported by a holder 11c which is in turn secured to the lower head 10. The liquid delivery unit 11 has an inlet fed with the liquid electrolyte from the supply control unit 17 (FIG. 1) to deliver it onto the workpiece 1 through the nozzle 11a. The fluid honing nozzle 24 obliquely oriented towards a region on the programmed machining path is provided with a fluid inlet chamber 25 which communicates with a source 26 of an abrasive honing fluid. The chamber 25 is secured to a rotary carriage 27 which is rotatable about the holder 25 coaxially therewith. The rotary carriage 27 is rotated by a motor 28 which is drivingly coupled therewith via a gear transmission 29. The motor 28 is carried by the upper head 9 and is adapted to be controllably driven in response to command signals from the NC unit 7.

The beam gun 12 obliquely oriented towards a region on the programmed machining path depends from an attachment 30 which is in turn secured to a rotary carriage 31. The latter is rotatable about the rotary carriage 27 coaxially therewith and rotated by a motor 32 which is drivingly coupled therewith via a gear transmission 33. The motor 32, too, is carried by the head 9 and is adapted to be controllably driven in response to command signals from to NC unit 7. The beam gun 12 may here again be for a laser beam and is shown as being connected via a flexible optical transmission 34 with a source of laser 18 (FIG. 1).

The motor 32 for positioning the beam gun 12 and the motor 28 for positioning the fluid honing nozzle 24 may be controlled so that when the liquid delivery nozzle 11a is vertically oriented towards a first region on the programmed machining path, the beam gun 12 remains obliquely oriented towards a second region adjacent to the first region on the programmed machining path and the fluid honing nozzle 24 remains obliquely oriented towards a third region immediately behind the second region along the programmed machining path in spite of changes in the course of a programmed machining path.

Figure 3A:
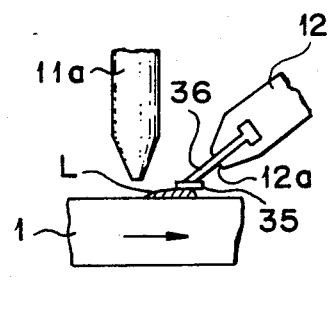
FIGS. 3a and 3b are diagrammatic side and plan views, respectively, illustrating a discharge system as a part of the arrangement of FIGS. 1 or 2.
Figure 3B:
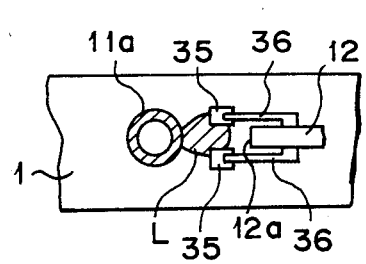

FIGS. 3a, 3b, 4 and 5 show modifications of the embodiments of FIGS. 1 and 2 in which the beam energy is combined with electrical discharge energy to enhance thermal and impulsive actions applied to a localized area at the interface between the liquid electrolyte supplied from the delivery nozzle 11a and the ceramic material 1. In FIGS. 3a and 3b, a pair of heat-resistant electrodes 35 are shown as attached to the beam gun 12 via respective holders 36 so as to be spacedly juxtaposed with each other across a space immediately ahead of the gun opening 12a and to be disposed in contact with the liquid electrolyte L delivered form the nozzle 11a onto the workpiece 1. A power supply (not shown) is electrically connected to the electrodes 35 to supply an electrical power in the form of a continuous DC or preferably a succession of pulses between them across the liquid electrolyte L, the electric power being of a voltage and current sufficient to effect electrical discharge through a portion of the electrolyte, thereby thermally activating the ceramic material and the reactive electrolytic components to allow the former to be chemically degenerated with the latter at the localized region. Due to the localized development of the electrical discharge and chemical reactions a high-density mechanical action is also created at the localized region to impulsively dislodge the chemically degenerated ceramic stock from the workpiece 1.

Figure 4:
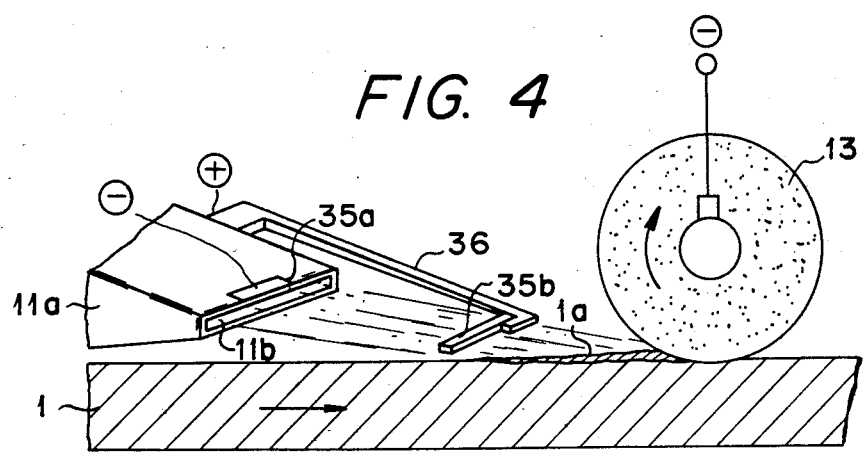
FIG. 4 is a diagrammatic view illustrating another form of the discharge system which may be used with an abrasive wheel.

In FIG. 4, the discharge electrodes 35 are shown as being attached to the electrolyte delivery nozzle 11a. The nozzle 11a is here formed with narrow rectangular nozzle opening 11b (e.g. 1 mm thick and 10 mm wide) adapted to deliver a thin, film-like flow of the liquid electrolyte (e.g. an aqueous solution containing 5 to 40% by weight hydrogen chloride) at a velocity of 10 to 100 meters/second and a flow rate of 1 to 100 cc. One of the electrodes 35a is mounted directly on the nozzle 11a adjacent to the opening 11b and the other 35b is supported by the nozzle by means of the holder 36 so as to lie ahead of the nozzle opening 11b. Preferably, the electrode 35b is poled positive and the electrode 35a negative since electrical discharges tends to concentrate at the positive electrode, thus closer to the workpiece 1. The abrasive wheel 13 is disposed ahead of the electrode 35b to abrade the chemically degenerated layer 1a, thereby mechanically facilitating removal thereof from the workpiece 1. The abrasive wheel 13 is preferably of an electrically conductive abrasive body as prepared by sintering a mixture of titanium carbide and/or titanium nitride with diamond, boron carbide, cubic boron nitride and/or silicon carbide. Then, preferably the wheel 13 is electrically poled negative with respect to both electrodes 35a and 35b to prevent it from being worn by electrolytic erosion.

Figure 5:
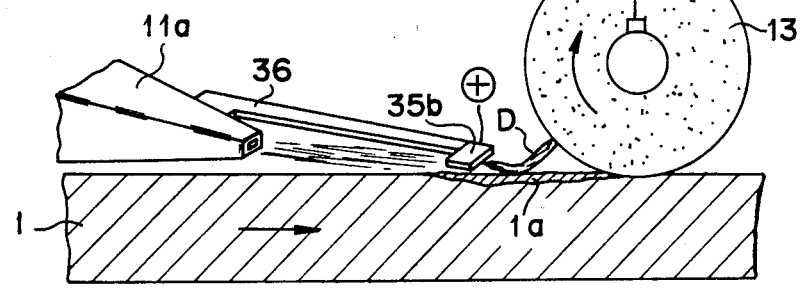
FIG. 5 is a similar view illustrating a modification of the discharge arrangement of FIG. 4.

In the arrangement of FIG. 5, the electrode 35a in FIG. 4 is omitted, and the electrically conductive abrasive wheel 13 is poled negative while the electrode 35b is poled positive to pass discharge energization current directly through a region therebetween. A localized area 1a of the ceramic material what is dielectric, when heated at an elevated temperature, becomes electrically conductive and hence comes to act as an intermediate electrode to carry the discharge current which is deflected as shown at D. Increased localization of the discharge energy is thus obtained.

Figure 6:
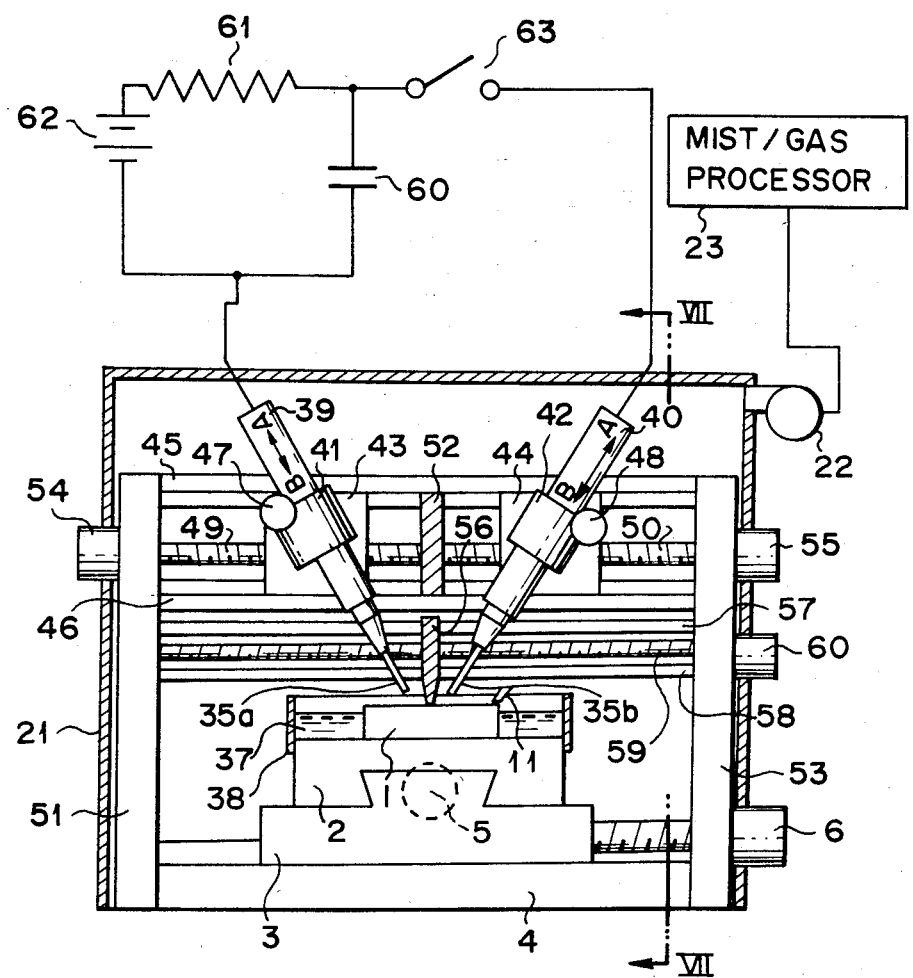
FIG. 6 is a diagrammatic front view illustrating another form of the machining apparatus utilizing electrolytic discharges between electrodes.
Figure 7:
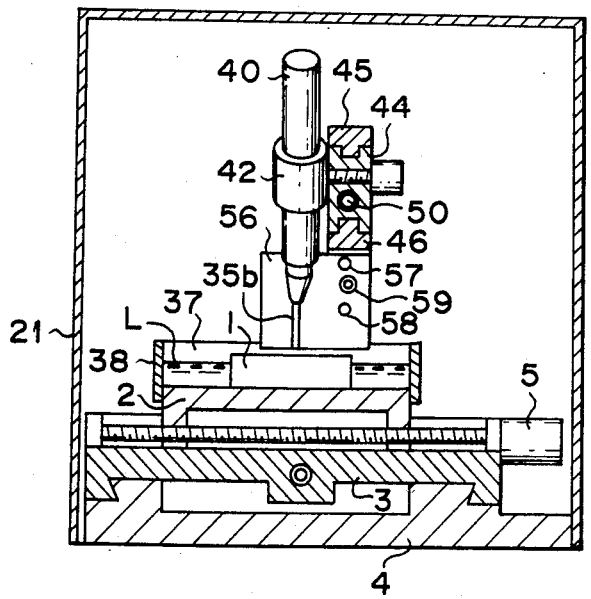
FIG. 7 is a diagramatic side view partly in section taken along the line VII—VII in FIG. 6.
Figure 8:
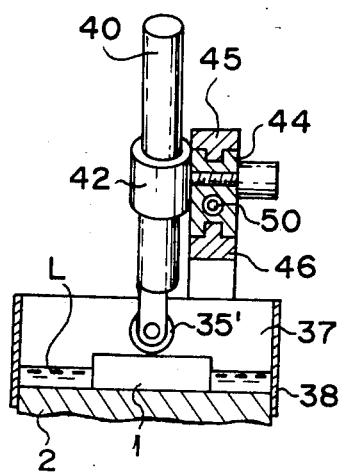
FIG. 8 is a similar view diagramatically illustrating an alternative form of each or one of the electrodes used in the system of FIG. 6.

In FIGS. 6 and 7, in which the same reference numerals as in the previous FIGURES are used to designate the same or similar functional elements, a pair of elongate discharge electrodes 35a, 35b, each in the form of a rod or kneedle, are shown as juxtaposed with the workpiece 1 of a ceramic material securely accommodated in a worktank 37 defined by the worktable 2 and side walls 38. One or each of the electrodes may also be in the form of a conductive disk or wheel as shown at 35' in FIG. 8. The liquid electrolyte L supplied onto the workpiece 1 from a delivery nozzle 11 is shown as collected in the worktank 37. Each of the electrodes 35a, 35b is securely held by a holder 39, 40 extending coaxially therewith, which is in turn slidably movable through a bracket 41, 42. The brackets 41 and 42 are pivotally mounted on carriages 43 and 44, respectively, which are slidably movable horizontally between an upper and a lower beam 45, 46. The brackets 41 and 42 are secured to the carriages 43 and 44 so that the electrodes 35a and 35b are inclined downwards and approach each other along their axes towards the workpiece 1. Each of the holders 39, 40 and hence the electrodes 35a, 35b is movable axially by a motor 47, 48 securely mounted on the bracket 41, 42 and is secured in position where each electrode free end has a given small spacing with the workpiece 1.

The carriages 43 and 44 are movable on horizontal lead screws 49 and 50 which are journaled between one side post 51 and a central bracket 52 and between the latter and the other side post 53, respectively, both of the posts standing upright on the base 4. The parallel beams 45 and 46 are also supported by and extend between the posts 51 and 53. The lead screws 49 and 50 are driven by motors 54 and 55 secured to the posts 51 and 53, respectively, for positioning the carriages 43 and 44. Disposed vertically between the forwardly inclined electrodes 35a and 35b is a partition plate 56 composed of an insulating material and supported by another set of parallel beams 57 and 58, each of which extends horizontally between the side posts 51 and 53. The partition plate 56 is horizontally movable on a lead screw 59 journaled on the side posts 51 and 53. The lead screw 59 is driven by a motor 60 mounted on the post 53 for positioning the partition plate 56. The partition plate 56 is preferably constituted as a fluid delivery nozzle 11 by being formed with a nozzle opening 11b and an internal bore to communicate with the source 16 of the liquid electrolyte and the supply control unit 17 (FIG. 1). In addition, such a nozzle is preferably arranged to also form an abrasive honing nozzle. To this end, means may be provided to introduce abrasive particles into the liquid electrolyte prior to entry into the partition 56.

A power supply for energizing the electrodes 35a, 35b may comprise a capacitor 60 periodically chargeable via a resistor 61 by a DC source 62 and dischargeable across the electrodes 35a and 35b via a switch 63. The switch 63 is of electronic type and alternately turned on and off in response to periodic switching signals furnished from an oscillator (not shown). Each time the switch 63 is turned on, an impulsive electrical discharge is passed across a small spacing between the electrodes 35a and 35b through a film of the liquid electrolyte adjacent the workpiece 1. the insulating partition 36 is provided to confine the electrical discharge closer to the workpiece 1. There thus develops a highly localized thermal and mechanical energy of a magnitude sufficient to chemically degenerate and then dislodge a portion of the ceramic material. A high-frequency repetition of such electrolytic discharges may be effected to continue localized stock removal from the nonconductive ceramic material as the workpiece 1 is displaced along a programmed machining path according to command signals furnished from the NC unit 7.

What is claimed is:

1. A method of machining a workpiece of a ceramic material, comprising the steps of:

bringing into contact with the workpiece a liquid electrolyte having at least one component which is chemically reactive with the ceramic material at an elevated temperature;

applying to a limited zone of interface between said liquid electrolyte and said workpiece, localized energy of a magnitude sufficient to heat said liquid electrolyte and said material at said limited zone to said elevated temperature and to remove from the workpiece the locally heated material at said limited zone in a form at least partially chemically degenerated with said at least one component; and displacing, in a scanning manner, said limited zone acquiring said localized energy from one region to another on said workpiece along a programmed continuous path to continuously remove said material along said path from the workpiece, said localized energy being applied by irradiating said limited zone with an energy beam, said zone being displaced along said path by relatively displacing said energy beam and said workpiece along said programmed path, a portion of said localized energy being applied to said limited zone by disposing a pair of electrodes closely spaced apart from each other adjacent to said limited zone and effecting a succession of electrical discharges through said liquid electrolyte across said electrodes, said electrodes and said workpiece being also relatively displaced in a said scanning manner to displace said limited zone from one region to another on the workpiece along said programmed path.

2. The method defined in claim 1 wherein said energy beam is a laser beam.

3. The method defined in claim 1 wherein said energy beam is a microwave beam.

4. A method of machining of a ceramic material, comprising the steps of:

bringing into contact with the workpiece a liquid electrolyte having at least one component which is chemically reactive with the ceramic material at an elevated temperature;

applying to a limited zone of interface between said liquid electrolyte and said workpiece, localized energy of a magnitude sufficient to heat said liquid electrolyte and said material at said limited zone to said elevated temperature and to remove from the workpiece the locally heated material at said limited zone in a form at least partially chemically degenerated with said at least one component; and displacing, in a scanning manner, said limited zone acquiring said localized energy from one region to another on said workpiece along a programmed continuous path to continuously remove said material along said path from the workpiece, said localized energy comprising at least two different forms of energy, a first of which is applied to said limited zone to heat it to said elevated temperature and a second of which is applied to said zone so heated by said first form of energy to mechanically facilitate removal of said locally degenerated ceramic material from the workpiece.

5. A method of machining a workpiece of a ceramic material, comprising the steps of:

bringing into contact with the workpiece a liquid electrolyte having at least one component which is chemically reactive with the ceramic material at an elevated temperature;

applying to a limited zone of interface between said liquid electrolyte and workpiece, localized energy of a magnitude sufficient to heat said liquid electrolyte and said material at said limited zone to said elevated temperature and to remove from the workpiece the locally heated material at said limited zone in a form at least partially chemically degenerated with said at least one component; and displacing, in a scanning manner, said limited zone acquiring said localized energy from one region to another on said workpiece along a programmed continuous path to continuously remove said ceramic material along said path from the workpiece, said localized energy being applied to said limited zone by disposing a pair of electrodes so that they are spaced apart across a small gap adjacent to said zone and effecting a succession of electrical discharges through said liquid electrolyte across said electrodes, said electrodes and said workpiece being relatively displaced along said programmed path to displace said limited zone from one region to another on the workpiece.

6. The method defined in claim 5 wherein said electrodes are forwardly inclined to approach each other toward said workpiece so as to form said small spacing adjacent to said workpiece.

7. The method defined in claim 5 or claim 6 wherein at least one of said electrodes is disk-shaped.

8. The method defined in claim 5 or claim 6, further comprising disposing a partition substantially composed of an insulating material between said electrodes so as to confine development of said electrical discharges through said liquid electrolyte adjacent to said limited zone.

9. An apparatus for machining a workpiece of a ceramic material, comprising:

means for supplying onto the workpiece a liquid electrolyte having at least one component which is chemically reactive with the ceramic material at an elevated temperature;

means for applying to a limited zone of interface between said liquid electrolyte and said workpiece, localized energy of a magnitude sufficient to heat said liquid electrolyte and said material at said limited zone to said elevated temperature and to remove from the workpiece the locally heated material at said limited zone in a form at least partially chemically degenerated with said at least one component; and means for displacing, in a scanning manner, said limited zone acquiring said localized energy from one region to another on said workpiece along a programmed continuous path to continuously remove said material along said path from the workpiece, said means for applying comprising a pair of electrodes juxtaposed with each other across a small gap spacing adjacent to said zone, and a power supply for energizing said electrodes to produce thereacross a succession of electrical discharges through said liquid electrolyte.

10. The apparatus defined in claim 9 wherein said means for applying further includes a beam gun for irradiating said limited zone of interface with an energy beam.

11. The apparatus defined in claim 10 wherein said electrodes are forwardly inclined to approach each other towards said workpiece so as to form said small spacing adjacent to said workpiece.

12. The apparatus defined in claim 11 wherein said electrodes are axially elongated to form said small gap spacing at their forward end portions.

13. The apparatus defined in claim 10, claim 11, claim 12, further comprising a partition member substantially composed of an insulating material between said electrodes so as to confine development of said electrical discharges through said liquid electrolyte adjacent to said successive limited zones.

14. The apparatus defined in claim 10, or claim 9, further comprising means for abrading said at least partially chemically degenerated zone to mechanically facilitate dislodgement thereof from said workpiece.

15. A method of machining a workpiece of a dielectric material, comprising the steps of:

flushing onto the workpiece a fluid having at least one component to which said dielectric material is normally inert but with which it becomes chemically reactive at an elevated temperature;

irradiating a limited zone on said workpiece traversed by said flushing fluid, with an energy beam with localized energy of a magnitude sufficient to locally heat said dielectric material at said limited zone to said elevated temperature;

applying to said limited zone further localized energy of a magnitude sufficient to mechanically dislodge from the workpiece the locally heated dielectric material at said zone in a form at least partially chemically degenerated with said at least one component and to permit the dislodged material to be carried away with said flushing fluid; and relatively displacing said energy beam and said workpiece automatically in a predetermined scanning manner to shift said limited zone of irradiation of said energy beam progressively over a programmed region of the workpiece so that the workpiece is selectively machined in said region.

16. The method defined in claim 15 wherein said fluid is flushed in contact with said workpiece at a velocity ranging between 10 and 100 meters/second.

17. The method defined in claim 15 wherein said component includes a strong acid.

18. The method defined in claim 15 wherein said component includes a strong base.

19. A method of machining a workpiece of a dielectric material which becomes electrically conductive at an elevated temperature, comprising the steps of:

flushing a conductive fluid in contact with the workpiece;

irradiating a limited zone on said workpiece traversed by said flushing fluid, with an energy beam with localized energy of a magnitude sufficient to locally heat said dielectric material at said zone to said elevated temperature, thereby rendering said material at said limited zone selectively electrically conductive;

disposing a pair of electrodes so that they are spaced apart from each other across a small gap adjacent said zone and effecting a succession of electrical discharges through said conductive fluid and said dielectric material rendered conductive at said zone adjacent said gap to erosively dislodge said material at said zone from the workpiece; and relatively displacing said energy beam and said electrodes on the one hand and said workpiece on the other hand in a predetermined scanning manner to shift said zone of localized heating and material dislodgment progressively over a programmed region of the workpiece so that the workpiece is selectively machined in said region.

20. An apparatus for machining a workpiece of a dielectric material, comprising:

means for flushing onto the workpiece a solution having at least one component to which said dielectric material is normally inert but with which it at an elevated temperature becomes chemically reactive;

means for irradiating a limited zone on said workpiece through said flushing solution with an energy beam with localized energy of a magnitude sufficient to locally heat said dielectric material flushed with said solution at said limited zone to said elevated temperature;

means for applying to said limited zone further localized energy of a magnitude sufficient to mechanically dislodge from the workpiece the locally heated dielectric material at said zone in a form at least partly chemically degenerated with said at least one component and to permit the dislodged material to be carried away with said flushing solution; and numerically controlled drive means for relatively displacing said energy beam and said workpiece automatically in a predetermined scanning manner to shift said limited zone of irradiation of said energy beam progressively over a programmed region of the workpiece so that the workpiece is selectively machined in said region.

21. An apparatus for machining a workpiece of dielectric material which becomes electrically conductive at an elevated temperature, comprising:

means for flushing a liquid electrolyte in contact with the workpiece;

means for irradiating a limited zone on said workpiece through said flushing liquid electrolyte and said workpiece with an energy beam with localized energy of a magnitude sufficient to locally heat said dielectric material at said limited zone to said elevated temperature, thereby rendering said material at said zone selectively electrically conductive;

means including a pair of electrodes disposed spaced apart across a small gap adjacent said zone and a power supply for effecting a succession of electrical discharges through said liquid electrolyte and said material rendered conductive at said limited zone to remove said material at said zone from the workpiece; and numerically controlled drive means for relatively displacing said beam and said electrode on one part and said workpiece on the other part in a predetermined scanning manner to shift said zone of localized heating and material removal progressively over a programmed region of the workpiece so that the workpiece is selectively machined in said region.

* * * * *